(12) United States Patent
Ojha et al.

(10) Patent No.: US 11,272,171 B1
(45) Date of Patent: Mar. 8, 2022

(54) SYSTEMS AND METHODS FOR FALLBACK TRACKING BASED ON REAL-TIME TRACKING PERFORMANCE

(71) Applicant: Facebook Technologies, LLC, Menlo Park, CA (US)

(72) Inventors: Philipp Ojha, Fremont, CA (US); Dony George, Sunnyvale, CA (US); Daniel Berhane Worku, Menlo Park, CA (US); Merlyn Deng, Palo Alto, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/422,691

(22) Filed: May 24, 2019

(51) Int. Cl.
*H04N 17/00* (2006.01)
*H04N 5/232* (2006.01)
*G06K 9/00* (2006.01)

(52) U.S. Cl.
CPC ....... *H04N 17/002* (2013.01); *G06K 9/00664* (2013.01); *H04N 5/23203* (2013.01)

(58) Field of Classification Search
CPC ............. H04N 17/002; H04N 5/23203; G06K 9/00664
USPC ........................................................ 348/169
See application file for complete search history.

(56) References Cited

U.S. PATENT DOCUMENTS

| | | | |
|---|---|---|---|
| 2003/0054881 A1* | 3/2003 | Hedrick | G07F 17/3239 463/29 |
| 2018/0046863 A1* | 2/2018 | Chen | G06K 9/00744 |
| 2018/0137632 A1* | 5/2018 | Takada | G06T 3/00 |
| 2018/0232563 A1* | 8/2018 | Albadawi | G06K 9/00214 |
| 2018/0260961 A1* | 9/2018 | Narita | G06K 9/481 |

* cited by examiner

*Primary Examiner* — Dakshesh D Parikh
(74) *Attorney, Agent, or Firm* — Foley & Lardner LLP (57) ABSTRACT

A system can include one or more processors configured to execute a first object tracker to detect one or more objects in images received via a sensor of a device, monitor one or more metrics of the first object tracker, determine that the one or more metrics do not meet a criteria corresponding to a profile of the device, and use, responsive to the determination, a second object tracker instead of the first object tracker.

11 Claims, 4 Drawing Sheets

SYSTEMS AND METHODS FOR FALLBACK TRACKING BASED ON REAL-TIME TRACKING PERFORMANCE

FIELD OF THE DISCLOSURE

The present disclosure relates generally to augmented reality (AR) systems. More particularly, the present disclosure relates to systems and methods for fallback tracking based on real-time tracking performance.

BACKGROUND

The present disclosure relates generally to augmented reality (AR) systems. AR systems can be used to present various images, including three-dimensional (3D) images, to a user. For example, AR headsets can be used to present images to the user in a manner that is overlaid on a view of a real world environment. The images can be presented based on tracking objects in an environment around the AR headset.

SUMMARY

Various aspects of the present disclosure relate to systems and methods for fallback tracking based on real-time tracking performance. For example, a system can monitor performance metrics regarding trackers as well as other capabilities, such as segmentation capabilities, implemented by an AR system or a head mounted display (HMD), also known as a head-worn display (HWD). The system can determine whether to use the tracker or fall back to a tracker that may have lower processing requirements or fidelity based on the monitored metrics. For example, the system can adjust operating parameters of the tracker or request, install, and operate a different tracker if the metric does not meet a corresponding criteria (e.g., threshold). The metric can correspond to a profile of the device that operates the tracker, such as a profile indicating processing capacity or processing capability of the device. The trackers can be used to track targets such as faces, hands, or other objects or features thereof that are detected based on images received from cameras of the AR system or HMD. For example, a tracker can track a number of landmarks or tracking points, such as 96 points for face tracking, and if a metric for the tracker does not meet a corresponding criteria, the system can cause the tracker to use fewer landmarks or tracking points (e.g., 48 points), or request, install, and operate a different tracker that has lower fidelity. The tracker to which the system falls back can be selected from multiple trackers based on the metrics.

The system can monitor any of a variety of metrics or combinations thereof. For example, the system can monitor an attachment time indicative of a duration of time for the tracker to attach to a target from when the target is detected, a recovery delay indicative of the time that a user of the AR system or HMD waits for recovery of tracking after a tracking loss, a tracking duration indicative of a lag that the user experiences when the image capture device or target moves, and a tracking success rate indicative of a fraction of time that the user experiences AR. The metrics can include a time to initialization of the tracker (e.g., from a time at which tracking is requested), as well as life cycle metrics, such as running averages or other statistics regarding the metrics over the course of usage of the tracker.

At least one aspect of the present disclosure relates to a method that can be used for fallback tracking. The method includes executing, by one or more processors of a device, a first object tracker to detect one or more objects in images received via a sensor of the device. The method includes monitoring, by the one or more processors, one or more metrics of the first object tracker. The method includes determining, by the one or more processors, that the one or more metrics do not meet a criteria corresponding to a profile of the device. The method includes using, by the one or more processors, responsive to the determination, a second object tracker instead of the first object tracker.

At least one aspect of the present disclosure relates to a system. The system can include one or more processors configured to execute a first object tracker to detect one or more objects in images received via a sensor of a device, monitor one or more metrics of the first object tracker, determine that the one or more metrics do not meet a criteria corresponding to a profile of the device, and use, responsive to the determination, a second object tracker instead of the first object tracker.

At least one aspect of the present disclosure relates to a computer-readable medium that includes processor-executable instructions that when executed by one or more processors, cause the one or more processors to execute a first segmenter in a tracking operation to detect one or more objects in images received via a sensor of the device, monitor one or more metrics of the first segmenter, determine that the one or more metrics do not meet a criteria corresponding to a profile of the device, and use, responsive to the determination, a second segmenter instead of the first segmenter.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

AR systems can use an HMD (may also be referred to as a head-worn display (HWD)) or other electronic device, such as a mobile device, to present images to a user at appropriate depth. The HMD or AR system can determine depth information for objects or features in a scene and render those objects and features at the determined depth (e.g., at least partially in response to the depth information). For example, the HMD can be used to present images that can be viewed stereoscopically, such as by sequentially or simultaneously presenting left eye images and right eye images, enabling a user to perceive a 3D environment. The HMD or the AR system can include one or more cameras that capture images from multiple perspectives, such as left eye and right eye images.

The HMD or AR system (e.g., the electronic device that implements at least some features of the AR system) can operate various trackers or other capabilities, such as segmentation capabilities, that can track or otherwise perform image processing operations on targets that are detected using images captured by image capture devices (e.g., cameras) of the HMD or AR system. For example, trackers can be used to track targets such as faces, hands, or other objects or features thereof that are detected based on images received from cameras of the AR system or HMD. A tracker can track a number of landmarks or tracking points, such as 96 points for face tracking a face as the face moves or changes expressions. By tracking the tracking points, the tracker can attach image data to the tracking points, which can follow the tracking points in images presented by the AR system or HMD over time as the camera or target moves. However, depending on various processing capabilities or other operating conditions of the AR system or HMD while operating the tracker, the tracker may have insufficient performance, which can result in effects such as latency, lag, or judder (e.g., slow or uneven response times as the camera or target moves).

Systems and methods in accordance with certain aspects of the present solution can enable AR systems, HMDs, and other devices to more effectively operate trackers, segmentation, or other capabilities by monitoring metrics regarding operation of the trackers and the device that operates the tracker, such as real-time metrics while the trackers are operating, comparing the metrics to respective criteria, and falling back to different trackers (e.g., trackers having lower fidelity or lower processing requirements) if the metrics do not satisfy the respective criteria. For example, if the tracker tracks 96 points for face tracking, and the system determines a metric of the tracker does not satisfy the corresponding criteria, the system can fall back to operating a tracker that tracks fewer than 96 points (e.g., 48 points) for face tracking. The fallback tracker may thus have a lower fidelity yet also a lower processing demand on the AR system or HMD, so that the tracker can be more responsive to dynamic changes in the images on which the tracker operates (e.g., changes resulting from movement of the camera(s) and or the target being tracked).

The system can monitor any of a variety of metrics or combinations thereof. For example, the system can monitor operating parameters corresponding to a profile of the device that operates the object trackers, such as processing speeds, memory usage, network speeds, image quality, screen resolution, or frame rates. The system can monitor an attachment time indicative of a duration of time for the tracker to attach to a target from when the target is detected, a recovery delay indicative of the time that a user of the AR system or HMD waits for recovery of tracking after a tracking loss, a tracking duration indicative of a lag that the user experiences when the image capture device or target moves, and a tracking success rate indicative of a fraction of time that the user experiences AR. The metrics can include a time to initialization of the tracker (e.g., from a time at which tracking is requested), as well as life cycle metrics, such as running averages or other statistics regarding the metrics over the course of usage of the tracker.

Figure 1:
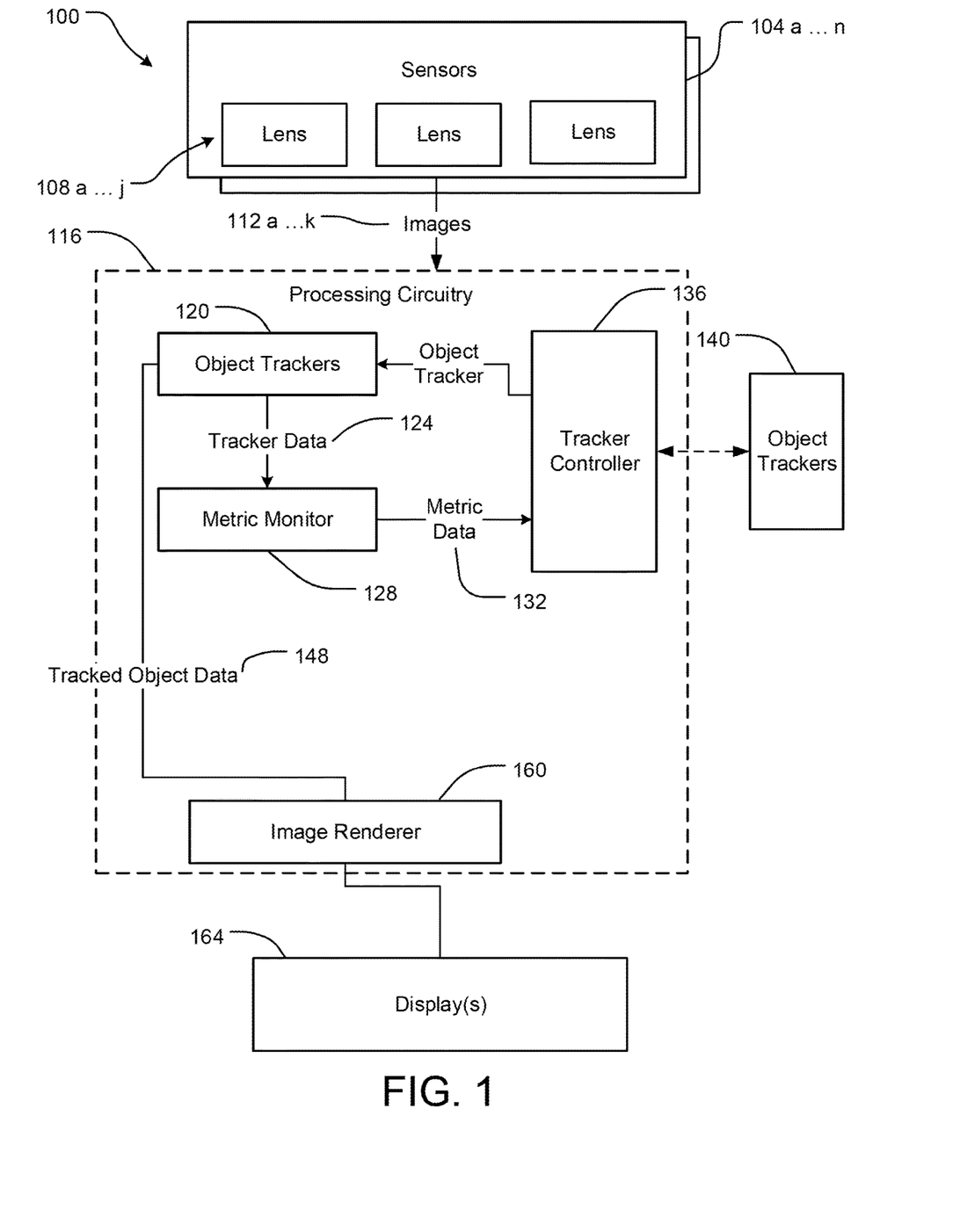
FIG. 1 is a block diagram of a display system according to an implementation of the present disclosure.

Referring now to FIG. 1, a system 100 can include a plurality of sensors 104a . . . n, processing circuitry 116, and one or more displays 164. The system 100 can be implemented using the HMD system 200 described with reference to FIG. 2. The system 100 can be implemented using the computing environment described with reference to FIG. 4, such as by using a mobile device that may implement features of client computing system 414. The system 100 can incorporate features of and be used to implement features of virtual reality (VR) systems. At least some of the processing circuitry 116 can be implemented using a graphics processing unit (GPU). The functions of the processing circuitry 116 can be executed in a distributed manner using a plurality of processing units.

The processing circuitry 116 may include one or more circuits, processors, and/or hardware components. The processing circuitry 116 may implement any logic, functions or instructions to perform any of the operations described herein. The processing circuitry 116 can include any type and form of executable instructions executable by any of the circuits, processors or hardware components. The executable instructions may be of any type including applications, programs, services, tasks, scripts, libraries processes and/or firmware. Any of the object trackers 120, metric monitor 128, tracker controller 136, or image renderer 160 may be any combination or arrangement of circuitry and executable instructions to perform their respective functions and operations. At least some portions of the processing circuitry 116 can be used to implement image processing executed by the sensors 104.

The sensors 104a . . . n can be image capture devices or cameras, including video cameras. The sensors 104a . . . n may be cameras that generate images of relatively low quality (e.g., relatively low sharpness, resolution, or dynamic range), which can help reduce the SWAP of the system 100. For example, the sensors 104a . . . n can generate images having resolutions on the order of hundreds of pixels by hundreds of pixels. At the same time, the processes executed by the system 100 as described herein can be used to generate display images for presentation to a user that have desired quality characteristics, including depth characteristics.

The sensors 104a . . . n (generally referred herein as sensors 104) can include any type of one or more cameras. The cameras can be visible light cameras (e.g., color or black and white), infrared cameras, or combinations thereof. The sensors 104a . . . n can each include one or more lenses 108 a . . . j generally referred herein as lens 108). In some embodiments, the sensor 104 can include a camera for each lens 108. In some embodiments, the sensor 104 include a single camera with multiple lenses 108 a . . . j. In some embodiments, the sensor 104 can include multiple cameras, each with multiple lenses 108. The one or more cameras of the sensor 104 can be selected or designed to be a predetermined resolution and/or have a predetermined field of view. In some embodiments, the one or more cameras are selected and/or designed to have a resolution and field of view for detecting and tracking objects, such as in the field of view of a HMD for augmented reality. The one or more cameras may be used for multiple purposes, such as tracking objects in a scene or an environment captured by the image capture devices and performing the calibration techniques described herein.

The one or more cameras of the sensor 104 and lens 108 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing object tracking.

The system 100 can include a first sensor (e.g., image capture device) 104a that includes a first lens 108a, the first sensor 104a arranged to capture a first image 112a of a first view, and a second sensor 104b that includes a second lens 108b, the second sensor 104b arranged to capture a second image 112b of a second view. The first view and the second view may correspond to different perspectives, enabling depth information to be extracted from the first image 112a and second image 112b. For example, the first view may correspond to a left eye view, and the second view may correspond to a right eye view. The system 100 can include a third sensor 104c that includes a third lens 108c, the third sensor 104c arranged to capture a third image 112c of a third view. As described with reference to FIG. 2, the third view may correspond to a top view that is spaced from an axis between the first lens 108a and the second lens 108b, which can enable the system 100 to more effectively handle depth information that may be difficult to address with the first sensor 104a and second sensor 104b, such as edges (e.g., an edge of a table) that are substantially parallel to the axis between the first lens 108a and the second lens 108b.

Light of an image to be captured by the sensors 104a . . . n can be received through the one or more lenses 108 a . . . j. The sensors 104a . . . n can include sensor circuitry, including but not limited to charge-coupled device (CCD) or complementary metal-oxide-semiconductor (CMOS) circuitry, which can detect the light received via the one or more lenses 108a . . . j and generate images 112a . . . k based on the received light. For example, the sensors 104a . . . n can use the sensor circuitry to generate the first image 112a corresponding to the first view and the second image 112b corresponding to the second view. The one or more sensors 104a . . . n can provide the images 112a . . . k to the processing circuitry 116. The one or more sensors 104a . . . n can provide the images 112a . . . k with a corresponding timestamp, which can facilitate synchronization of the images 112a . . . k when image processing is executed on the images 112a . . . k, such as to identify particular first the second images 112a, 112b representing first and second views and having the same timestamp that should be compared to one another to calculate gaze information.

The sensors 104 can include eye tracking sensors 104 or head tracking sensors 104 that can provide information such as positions, orientations, or gaze directions of the eyes or head of the user (e.g., wearer) of an HMD. In some embodiments, the sensors 104 are inside out tracking cameras configured to provide images for head tracking operations. The sensors 104 can be eye tracking sensors 104 that provide eye tracking data corresponding to at least one of a position or an orientation of one or both eyes of the user. The sensors 104 can be oriented in a direction towards the eyes of the user (e.g., as compared to sensors 104 that capture images of an environment outside of the HMD).

The sensors 104 can capture images 112 of an environment around the sensors 104. For example, the sensors 104 can capture images 112 of an environment in or around a field of view of the user of the HMD. The images 112 can be representations of the environment, such as color or grayscale array or matrix of pixels representing parameters of light captured from the environment (e.g., color, brightness, intensity). The environment can be an indoor or outdoor environment, including both natural and man-made structures, terrain, or other objects, including sky, clouds, roads, buildings, streets, pedestrians, or cyclists. The environment can include one or more objects (e.g., real-world objects), which can be represented by the images 112 captured by the sensors. The objects can include people or other animals, or features thereof, such as faces or hands.

The system 100 can operate one or more object trackers 120. The object trackers 120 can include any function, operation, routine, logic, or instructions executed by the system 100 or components thereof to perform functions such as tracking objects and segmenting images. The object tracker 120 can be operated using the processing circuitry 116, portions of the processing circuitry 116, sensors 104, or any combination thereof. The object tracker 120 can receive the images 112, and use the images 112 to track objects or features thereof. For example, the object tracker 120 can track motion of landmarks or tracking points of objects across images 112. The object tracker 120 can generate tracked object data 148, which can include data regarding objects detected by the object tracker 120, tracked points of the detected objects, or trackers that can be mapped or attached to the detected objects. The object tracker 120 can provide the tracked object data 148 to the image renderer 160, which the image renderer 160 can use to generate display images for presentation or display by display(s) 164 based on the tracked object data 148, such as to present trackers or other images that can be perceived as overlaid on the detected or tracked objects.

The object tracker 120 can detect objects using the images 112. For example, the object tracker 120 can process the image 112 or portions thereof to detect one or more objects represented by the images 112. The object tracker 120 can detect or identify objects represented by the image 112 by processing elements of the image 112 such as pixels or groups of pixels, such as by processing pixels or groups of pixels indicating colors, shapes, edges, contrast between pixels or groups of pixels, and spatial relationships between pixels. The object tracker 120 can detect objects by executing spatial filters, segmentation, or machine learning models trained to detect objects. The object tracker 120 can identify candidate objects from the image 112, such as groups of pixels representing edges, compare the candidate objects to one or more template objects (e.g., template objects or features thereof in an object database), and identify the objects of the image 112 based on candidate objects that match template objects. The object tracker 120 can apply various objection recognition algorithms or models to identify the objects. The objects can be real-world or simulated objects. In some embodiments, the object tracker 120 detects an object that is a face using facial recognition, such as by using a facial recognition model, algorithm, or facial feature templates that the object tracker 120 can match to candidate objects of the image 112.

In some embodiments, the object tracker 120 detects the object using an object database that can include location data of various objects, buildings, structures, roads, or other indoor and outdoor features. For example, the object tracker 120 can communicate with an object database mapping objects or features of objects to position data. The object database may also maintain semantic or textual information regarding objects, such as information regarding type, class, shape, color, size, or other features regarding the objects. The object tracker 120 can receive data regarding the position of the HMD or AR system (e.g., from position sensor 220 described with reference to FIG. 2), and use the data to retrieve one or more candidate objects from the object database. The object tracker 120 can compare the sensor data to the one or more candidate objects and information maintained by the object database regarding the one or more candidate objects to identify the object (e.g., by matching the sensor data to the information received from the object database).

The object tracker 120 can track objects using the images 112 by identifying a plurality of tracking points for each object and monitoring movement of the plurality of tracking points. For example, the object tracker 120 can detect the object using the image 112, and responsive to detecting the object, assign the plurality of tracking points to pixels of the image 112 corresponding to the detected object. In some embodiments, the object tracker 120 identifies the pixels to which to assign the plurality of tracking points based on the pixels by which the object tracker 120 detected the object. In some embodiments, the object tracker 120 identifies the pixels to which to assign the plurality of tracking points based on attachment rules, policies, or models. For example, the object tracker 120 can identify pixels that form edges or perimeters of the detected object, and preferentially assign the tracking points to the identified pixels. The object tracker 120 can provide the pixels of the detected object to a model trained to assign the tracking points (e.g., based on training data including image data for detected objects and corresponding tracking points assigned to the detected objects).

The object tracker 120 can assign the plurality of tracking points to images 112 responsive to receiving the images 112. The object tracker 120 can track the detected object across the images 112. In some embodiments, the object tracker 120 performs object detection on each image 112 to detect the detected object and, in response, assign tracking points to the detected object.

In some embodiments, the object tracker 120 uses at least one of first image data of a first image 112 or a plurality of first tracking points assigned to the first image 112 in order to assign a plurality of second tracking points to a second image 112 subsequent to the first image 112. For example, the first image data can include motion data indicative of motion of the detected object from the first image 112 to the second image 112 (or motion of the HMD or AR system, which may be received from position sensor 220 described with reference to FIG. 2), based on which the object tracker 120 can identify pixels of the detected object in the second image 112 that correspond to pixels of the detected object in the first image 112. The object tracker 120 can use the first tracking points as initial positions (e.g., starting points) from which to identify the plurality of second tracking points. In some embodiments, the object tracker 120 generates a first bounding box based on the plurality of first tracking points (e.g., a bounding box having edges that include or contain each first tracking point). The object tracker 120 can determine a first centroid of the first bounding box or the plurality of first tracking points, and update the first centroid for the second image 112 (e.g., based on motion data) to determine where to identify the plurality of second tracking points. The object tracker 120 can use any of a variety of tracking methods, such as Kalman filters, to track the detected object across the images 112 and assign tracking points to the detected object.

The object tracker 120 can attach a tracker to the detected object while tracking the detected object. The tracker can include two-dimensional or three-dimensional image data that the object tracker 120 maps to one or more attachment points of the detected object. The image data of the tracker can be an image which may be provided as an overlay by the image renderer 160 to display 164, such as an image representing a mask, crown, sunglasses, tools, or other objects. The image data of the tracker can indicate a parameter of the image provided by the image renderer 160 to display 164, such as parameters associated with brightness, color, or opacity.

By attaching the tracker to the object, the object tracker 120 can enable the image renderer 136 and display 164 to present images in which the tracker can be perceived as following the attachment points as the image capture device 104 or detected object moves over time. For example, the tracker can be perceived to be following facial movements as a tracked face changes in expression.

The object tracker 120 can assign the one or more attachment points to at least one of the tracking points that the object tracker 120 uses to track the object across the images 112. In some embodiments, the attachment points are identical to the tracking points. In some embodiments, the attachment points are mapped to fewer than a total number of the tracking points.

The object tracker 120 can generate the tracker as an image frame that maps image data of the tracker to a plurality of pixels, each pixel corresponding to a respective attachment points. The object tracker 120 can generate a plurality of image frames at a tracking rate. The object tracker 120 can track the detected object at a tracking rate which may be the same as or different than a frame rate at which the images 112 are received from sensors 104. For example, the object tracker 120 can sample the images 112 to generate the image frames of the tracker at a tracking rate that is less than the frame rate. In some embodiments, the object tracker 120 can interpolate between images 112 or tracking points of images 112, such as by averaging pixels of each tracking point between a first image 112 and a second image 112 subsequent to the first image 112, to generate image frames of the tracker at a tracking rate that is greater than the frame rate.

In some embodiments, the object tracker 120 performs segmentation using the images 112 to generate one or more segments of each image 112. For example, the object tracker 120 can use any of a variety of segmentation methods, such as clustering algorithms (e.g., K-means clustering), edge detection, or trained segmentation models. For example, the object tracker 120 can generate each segment to represent objects as well as non-object regions of the image 112 (e.g., segment the image 112 into a face, objects other than the face, such as buildings, and background, such as a sky).

The object tracker 120 can attach a tracker to any of the segments generated from the image 112. For example, the object tracker 120 can attach a first mask to a face segment of the image 112, and a second mask to a background (e.g., sky) segment of the image 112. In some embodiments, the object tracker 120 classifies or identifies a type of one or more of the segments of the image 112, such as by comparing image data of the segment to one or more type templates, and identifying the type by matching the image data of the segment to a corresponding type template.

The object tracker 120 can use processing capabilities of the processing circuitry 116 (and sensors 104) to perform the functions described herein. For example, firmware, software, operating systems, or applications running on the processing circuitry 116 can be used to operate the object tracker 120. As the object tracker 120 may be operated using processing circuitry 116 of various processing capacities or capabilities (e.g., processing speed, such as instructions per second, throughput, memory capacity), performance of the object tracker 120 may vary depending on the processing capacities of the processing circuitry 116 and one or more devices that implement the processing circuitry 116.

The processing capacities may correspond to or be represented by a profile of the device that implements the processing circuitry 116, such as a profile that includes an identifier of device, and which may indicate predetermined or expected processing capacities of the device(s). For example, the processing circuitry 116 can maintain a profile database including identifiers of devices and mapping processing capacities to each identifier. In some embodiments, the profile database indicates at least one object tracker 120 to use with the corresponding device. The indicated at least one object tracker 120 may be determined based on metric data corresponding to operation of the at least one object tracker 120 on a plurality of devices having the identifier, such as by determining that the at least one object tracker 120 meets criteria corresponding to the metric data for at least a threshold amount of usage across the devices from which the metric data is received.

For example, the profile can indicate features or operational parameters of the device, such as a processing metric such as an operating speed or clock speed at which the processing circuitry 116 performs operations (e.g., clock speed in operation cycles per second); a memory metric such as a size of memory of the processing circuitry 116 that can be used to operate the object tracker 120; a bandwidth or network speed of communication between components of processing circuitry 116 or with remote devices (e.g., via wired or wireless network connections with remote devices, such as to receive object trackers 140). The profile can indicate features such as a screen size or screen resolution of displays 164, or an image quality of images displayed by displays 164 (e.g., pixel density or resolution of images generated by image renderer 160). The profile can indicate a frame rate at which displays 164 can display images (e.g., based on a frame rate at which image renderer 160 provides images to displays 164). The profile can indicate a latency of one or more portions of an image processing and rendering pipeline of the processing circuitry 116, such as a difference in time between when the processing circuitry 116 receives images 112 from sensors 104 and when the image renderer 160 provides images to displays 164. The processing circuitry 116 can update the profile by monitoring various such features or operational parameters, such as by monitoring an average frame rate. The processing circuitry 116 can update the profile based on metrics monitored by metric monitor 128, such as metrics associated with operation of the object tracker 120.

The system 100 can include a metric monitor 128. The metric monitor 128 can include any function, operation, routine, logic, or instructions executed by the system 100 or components thereof to monitor metrics of the object tracker 120 or the processing circuitry 116 used to operate the object tracker 120.

The metric monitor 128 can receive or determine tracker data 124. The metric monitor 128 can receive the tracker data 124 from the object tracker 120; for example, the tracker data 124 can indicate values such as tracking rate at which the object tracker 120 generates image frames. The metric monitor 128 can receive or determine the tracker data 124 from the processing circuitry 116 or firmware or software of the processing circuitry 116 that operates the object tracker 120. For example, the metric monitor 128 can receive tracker data 124 that indicates a rate at which the processing circuitry 116 performs or executes instructions of the object tracker 120, or a processing demand or usage of the object tracker 120 (e.g., a fraction of the processing capacity or memory of the processing circuitry 116 used by the object tracker 120). The metric monitor 128 can periodically receive the tracker data 124. The metric monitor 128 can request the tracker data 124 at a relatively high rate for a predetermined duration of time responsive to installation or initialization of the object tracker 120, and may decrease the rate at which the tracker data 124 is requested subsequent to the predetermined duration of time if the object tracker 120 meets criteria.

The metric monitor 128 can determine a variety of metrics regarding operation of the object tracker 120 to generate metric data 132. The metric monitor 132 can provide the metric data 132 to tracker controller 136. As described below, the tracker controller 136 can monitor the metric data 132 to determine whether to continue to operate the object tracker 120 or fall back the object tracker 120, such as by modifying or replacing the object tracker 120.

The metric monitor 128 can determine metrics representing processing demand of the object tracker 120 as well as how images rendered using tracked object data 148 may be perceived by a user of the HMD or AR system, such as metrics corresponding to factors such as latency, lag, or judder. For example, the metric monitor 128 can determine metrics based on factors such as how operation of the object tracker 120 modifies processing times for the operations performed by the processing circuitry 116, such as a latency metric from when images 112 are received by processing circuitry 116 to when image renderer 160 provides images to displays 164 or when displays 164 display images.

The metric monitor 128 can determine metrics that correspond to the profile of the device(s) that implement the processing circuitry 116 that operates the object tracker 120. For example, the metric monitor 128 can monitor clock speed, memory usage, network speed, image quality, and/or frame rates. This can enable the metric monitor 128 to monitor performance of the device while the object tracker 120 is operating, such as to determine if performance capability of the device is sufficient to operate the object tracker 120 or if a different object tracker 120 should be used instead. In some embodiments, the metrics corresponding to the profile of the devices are independent of operation of the object tracker 120, such as screen resolution or pixel density; the metric monitor 128 can retrieve such values from the profile for use by the tracker controller 136 to determine which object tracker 120 to use.

In some embodiments, the metric monitor 128 determines an attachment time metric. The attachment time metric can indicate an attachment time from object detection by the object tracker 120 to attaching a tracker to the detected object (e.g., assigning a plurality of tracking points to the detected object). For example, the metric monitor 128 can retrieve, from the tracker data 124, a time stamp at which the object tracker 120 detected the detected object and a time stamp at which the object tracker 120 assigned the plurality of tracking points to the detected object. The time stamps may correspond to detection and attachment for the same image 112, or for different images 112 (e.g., object detection may be completed based on a first image 112, and tracker attachment may be completed based on a second image 112 that may be one or more frames subsequent to the first image 112). The metric monitor 128 can determine the attachment time metric by comparing the time stamps, such as by subtracting the time stamp at which the object tracker 120 detected the object from the time stamp at which the object tracker 120 assigned to the plurality of tracking points to the detected object.

The metric monitor 128 can determine a recovery delay metric. The recovery delay metric can indicate a time that a user waits for recovery of tracking after loss of tracking. For example, the metric monitor 128 can retrieve, from the tracker data 124, a time stamp at which the object tracker 120 indicates that the object tracker 120 fails to maintain attachment of the tracker to the detected object and a time stamp at which the object tracker 120 indicates that the object tracker 120 re-established attachment to the detected object. The metric monitor 128 can determine the recovery delay metric by comparing the time stamps. The metric monitor 128 can determine a tracking loss metric corresponding to a duration of time until which tracking loss occurs. For example, the metric monitor 128 can retrieve, from the tracker data 124, a time stamp at which the object tracker 120 assigned the plurality of tracking points to the detected object and the time stamp at which the object tracker 120 indicates that the object tracker 120 fails to maintain attachment of the tracker to the detected object, and determine the tracking loss metric by comparing the time stamps.

In some embodiments, the metric monitor 128 determines a tracking success rate. The tracking success rate can indicate a fraction of time that a user of the HMD or AR system experiences working AR, such as a fraction of time that the object tracker 120 (or other metrics determined by the metric monitor 128) meets respective criteria. For example, the metric monitor 128 can determine the tracking success rate to be a fraction of time that the attachment time metric is less than a threshold attachment time.

The metric monitor 128 can determine a lag metric (e.g., tracking duration). The lag metric can correspond to a lag that the user may experience as the detected object or target moves, or as the sensor 104 that provides the images 112 moves. The metric monitor 128 can determine the lag metric based on differences in time between (i) when the object tracker 120 receives the image 112 and (ii) at least one of when the object tracker 120 attaches the tracker to the detected object, when the object tracker 120 provides tracked object data 148 to the image renderer 160, when the image renderer 160 provides display images to displays 164, or when the displays 164 present display images.

The metric monitor 128 can monitor metrics over any number of cycles of operation of the object tracker 120, such as life cycle metrics. The metric monitor 128 can maintain statistical values regarding metrics, including but not limited to mean values, median values, standard deviations, histograms, or other such values. For example, the metric monitor 128 can maintain an average value of the attachment time metric. The metric monitor 128 can maintain the metrics over every instance of operation of the object tracker 120. The metric monitor 128 can apply a recency factor to the metrics, such as by weighing more recent metrics more than less recent metrics (e.g., assign a weight to the metric that decreases as a difference in time between a current time and a time at which the metric was determined increases; only use a recent set of metric values, such as the most recent ten metric values).

The system 100 can include a tracker controller 136. The tracker controller 136 can include any function, operation, routine, logic, or instructions executed by the system 100 or components thereof to determine which object tracker 120 to use and how to control operation of the object tracker 120. For example, the tracker controller 136 can receive the metric data 132 from the metric monitor 128 and determine whether to fall back the object tracker 120 based on the metric data 132.

The tracker controller 136 can periodically sample the metric monitor 128 to receive the metric data 132, such as by requesting the metric data 132 at predetermined intervals (e.g., every n frames); the metric monitor 128 can also provide the metric data 132 to the tracker controller 136 at predetermined intervals. In some embodiments, the tracker controller 136 requests or the metric monitor 128 provides the metric data 132 at a first, relatively higher rate within a predetermined duration of time of installation or initialization of the object tracker 120, and at a second, relatively lower rate subsequent to the predetermined duration of time responsive to the metric data 132 meeting respective criteria.

The tracker controller 136 can determine whether the metric data 132 meets criteria indicative of performance of the object tracker 120. For example, the criteria can include minimum or maximum thresholds regarding the metrics represented by the metric data 132. In some embodiments, the tracker controller 136 compares the metric data 132 to the thresholds to determine whether the metric data meets the criteria. For example, the tracker controller 136 can compare the attachment time metric to a criteria including a maximum attachment time threshold and determine the attachment time metric to meet the criteria responsive to the attachment time metric being less than the maximum attachment time threshold. The tracker controller 136 can compare the recovery delay metric to a criteria including a maximum recovery delay metric and determine the recovery delay metric to meet the criteria responsive to the recovery delay metric being less than the maximum recovery delay threshold. The tracker controller 136 can compare the tracking success rate to a criteria including a minimum tracking success rate and determine the tracking success rate to meet the criteria responsive to the tracking success rate being greater than or equal to the minimum tracking success rate. The tracker controller 136 can compare the lag metric to a criteria including a maximum lag metric and determine the lag metric to meet the criteria responsive to the lag metric being less than or equal to the minimum tracking success rate.

In some embodiments, the tracker controller 136 receives metric data 132 that corresponds to the profile of the device(s) used to operate the object tracker 120. For example, the tracker controller 136 can receive metrics such as operating speeds, memory usage, network speeds, image quality, or frame rates. The tracker controller 136 can compare the metric data 132 corresponding to the profile of the device to respective criteria. In some embodiments, the tracker controller 136 maintains in the profile database the respective criteria to which to compare the metric data 132 that corresponds to the profile. The criteria can indicate minimum or maximum thresholds for the metrics, such as minimum operating speeds, maximum memory usage, minimum network speeds, minimum image quality, or minimum frame rates. As such, the tracker controller 136 can use the metric data 132 to determine whether the device has sufficient performance capability to operate the object tracker 120.

In some embodiments, metrics corresponding to the profile of the device can include screen resolution, pixel density, clock speeds, memory size, network speeds or bandwidths, or various other such features of the device. The tracker controller 136 can compare the metrics to respective criteria that may be determined based on indications as to which devices have operated object trackers 120 with sufficient performances. For example, the tracker controller 136 can compare the clock speed of the device to a minimum threshold clock speed (which may have been determined based on feedback data indicating whether the object tracker 120 has operated with sufficient tracking rates on devices that have at least the minimum threshold clock speed).

Responsive to determining that the metric data 132 do not satisfy respective criteria, the tracker controller 136 can cause the system 100 to use a different object tracker instead of the object tracker 120. For example, the tracker controller 136 can modify the object tracker 120 to operate in a mode in which the object tracker 120 is expected to have a lesser processing demand (e.g., perform fewer operations or instructions to generate tracked object data 148 or each image frame of the tracked object data 148; generate tracked object data 148 of lesser data size; use less memory or processing units of the processing circuitry 116; decrease a tracking rate at which the object tracker 120 generates image frames of tracked object data 148) or replace or update the object tracker 120 to have a lesser processing demand if the metric data 132 does not satisfy the one or more thresholds.

The tracker controller 136 can communicate with a remote device that can provide object trackers 140. The object trackers 140 can include various object trackers 140 of varying fidelity, processing demands, and types of trackers that the object trackers 140 attach to detected objects when implemented by the system 100. The remote device can be any device that the tracker controller 136 can communicate with, such as server 212 described with reference to FIG. 2.

In some embodiments, responsive to determining that the object tracker 120 does not meet the threshold, the tracker controller 136 can request an object tracker 140, receive the object tracker 140 in response to requesting the object tracker 140, and cause the system 100 to operate using the object tracker 140. For example, the tracker controller 136 can receive the object tracker 140 as a firmware or software update that can be used to update the object tracker 120. The tracker controller 136 can configure the processing circuitry 116 to use the object tracker 140. In some embodiments, the tracker controller 136 receives the object tracker 140 as one or more parameters regarding operation of the object tracker 120, such as a number of tracking points used by the object tracker 120, and modify the object tracker 120 to operate using the one or more parameters of the object tracker 140.

The tracker controller 136 can select the object tracker to be used instead of the object tracker 120, such as by selecting the object tracker 140 or modifying parameters of the object tracker 120 based on the metric data 132. For example, the tracker controller 136 can determine, based on the metric data 132, an expected processing capacity of the processing circuitry 116 that operates the object tracker 120, such as a number of operations or calculations the processing circuitry 116 can perform or the tracking rate of the object tracker 120, and select the object tracker to be used for which these parameters are expected to meet corresponding thresholds. For example, if the tracker controller 136 determines that the metric data 132 indicates that the processing circuitry 116 can operate the object tracker 120 to generate thirty image frames per second, and a target image frame rate is sixty image frames per second, the tracker controller 136 can select the object tracker to be an object tracker that has half of an expected processing demand (e.g., uses half as many tracking points) as the object tracker 120.

The tracker controller 136 can use the metric monitor 128 to periodically monitor the object tracker 120 that is being operated, and can replace or modify the object tracker 120 that is being operated any number of times based on the metric data 132 received from the metric monitor 128. For example, the tracker controller 136 can determine that first metric data 132 for a first object tracker 120 does not meet respective criteria, select a second object tracker 120 to operate responsive to the first metric data 132 not meeting the respective criteria, determine that second metric data 132 for the second object tracker 120 does not meet respective criteria, and select a third object tracker 120 to operate responsive to the second object tracker 120 not meeting the respective criteria.

The processing circuitry 116 can include an image renderer 160. The image renderer 160 can be a 3D image renderer. The image renderer 160 may use image related input data to process, generate and render display or presentation images to display or present on one or more display devices, such as via an HMD. The image renderer 160 can generate or create 2D images of a scene or view for display on display 164 and representing the scene or view in a 3D manner. The display or presentation data to be rendered can include geometric models of 3D objects in the scene or view. The image renderer 160 may determine, compute or calculate the pixel values of the display or image data to be rendered to provide the desired or predetermined 3D image(s), such as 3D display data for the images 112 captured by the sensor 104.

The image renderer 160 can receive tracked object data 148 and generate the images based on the tracked object data 148. For example, the image renderer 160 can retrieve image data corresponding to a tracker generated by the object tracker 120 from the tracked object data 148, and generate display data such as pixel color or intensity based on the tracker.

The image renderer 160 can render frames of display data to one or more displays 164 based on temporal and/or spatial parameters. The image renderer 160 can render frames of image data sequentially in time, such as corresponding to times at which images are captured by the sensors 104. The image renderer 160 can render frames of display data based on changes in position and/or orientation to the sensors 104, such as the position and orientation of the HMD. The image renderer 160 can render frames of display data based on left-eye view(s) and right-eye view(s) such as displaying a left-eye view followed by a right-eye view or vice-versa.

The image renderer 160 can generate the display images using motion data regarding movement of the sensors 104a . . . *n* that captured the images 112a . . . *k*. For example, the sensors 104a . . . *n* may change in at least one of position or orientation due to movement of a head of the user wearing an HMD that includes the sensors 104a . . . *n* (e.g., as described with reference to HMD system 200 of FIG. 2). The processing circuitry 116 can receive the motion data from a position sensor (e.g., position sensor 220 described with reference to FIG. 2). The image renderer 160 can use the motion data to calculate a change in at least one of position or orientation between a first point in time at which the images 112a . . . k were captured and a second point in time at which the display images will be displayed, and generate the display images using the calculated change. The image renderer 160 can use the motion data to interpolate and/or extrapolate the display images relative to the images 112a . . . k.

Although the image renderer 160 is shown as part of the processing circuitry 116, the image renderer may be formed as part of other processing circuitry of a separate device or component, such as the display device, for example within the HMD.

The system 100 can include one or more displays 164. The one or more displays 164 can be any type and form of electronic visual display. The displays may have or be selected with a predetermined resolution and refresh rate and size. The one or more displays can be of any type of technology such as LCD, LED, ELED or OLED based displays. The form factor of the one or more displays may be such to fit within the HMD as glasses or goggles in which the display(s) are the leans within the frame of the glasses or goggles. The displays 164 may have a refresh rate the same or different than a rate of refresh or frame rate of the processing circuitry 116 or the image renderer 160 or the sensors 104.

Figure 2:
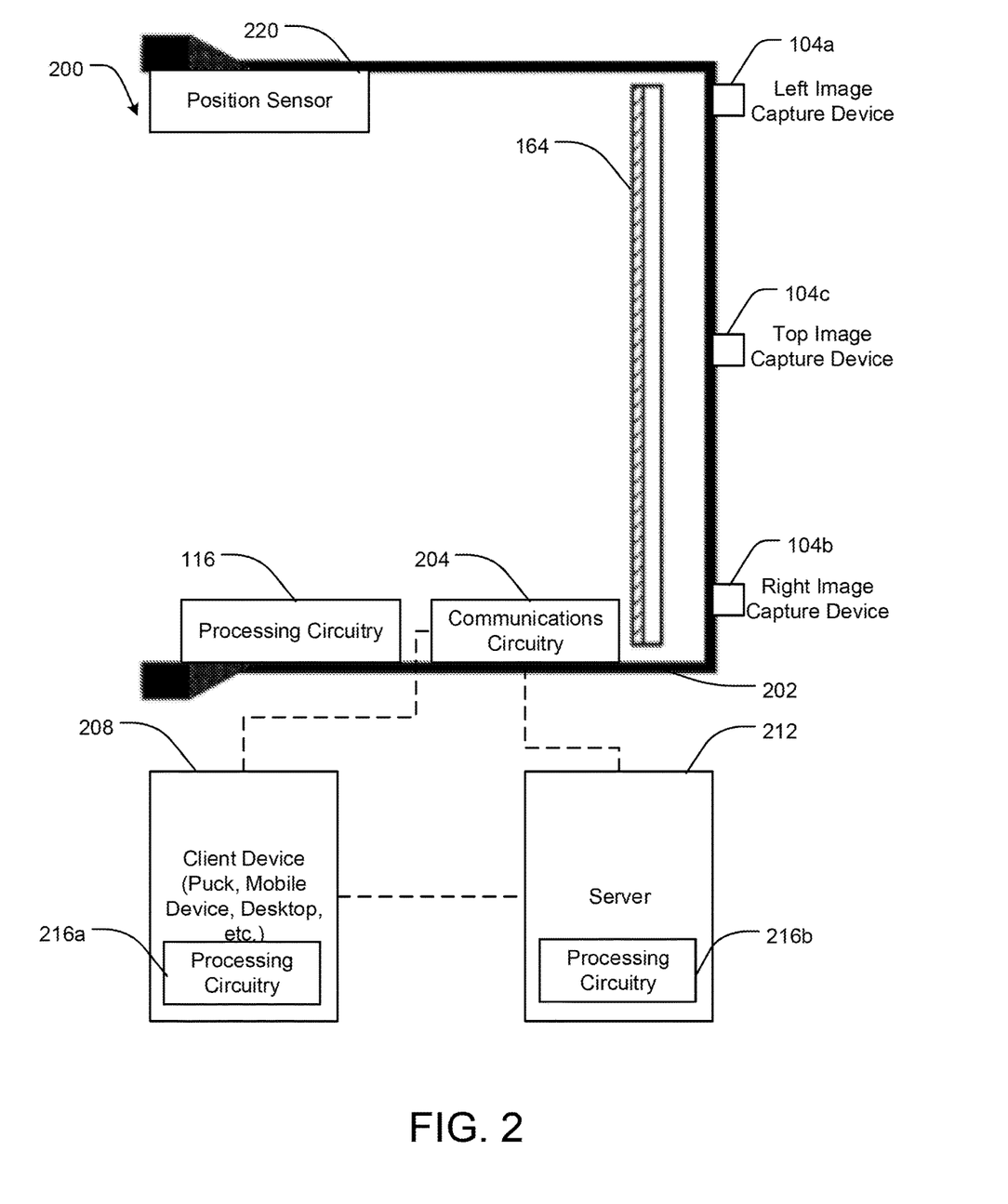
FIG. 2 is a schematic diagram of a head-mounted display (HMD) system according to an implementation of the present disclosure.

Referring now to FIG. 2, in some implementations, an HMD system 200 can be used to implement the system 100. The HMD system 200 can include an HMD body 202, a left sensor 104a (e.g., left image capture device), a right sensor 104b (e.g., right image capture device), and the display 164. The HMD body 202 can have various form factors, such as glasses or a headset. The sensors 104a, 104b can be mounted to or integrated in the HMD body 202. The left sensor 104a can capture first images corresponding to a first view (e.g., left eye view), and the right sensor 104b can capture images corresponding to a second view (e.g., right eye view).

The HMD system 200 can include a top sensor 104c (e.g., top image capture device). The top sensor 104c can capture images corresponding to a third view different than the first view or the second view. For example, the top sensor 104c can be positioned between the left sensor 104a and right sensor 104b and above a baseline between the left sensor 104a and right sensor 104b. This can enable the top sensor 104c to capture images with depth information that may not be readily available to be extracted from the images captured by the left and right sensors 104a, 104b. For example, it may be difficult for depth information to be effectively extracted from images captured by the left and right sensors 104a, 104b in which edges (e.g., an edge of a table) are parallel to a baseline between the left and right sensors 104a, 104b. The top sensor 104c, being spaced from the baseline, can capture the third image to have a different perspective, and thus enable different depth information to be extracted from the third image, than the left and right sensors 104a, 104b.

The HMD system 200 can include processing circuitry 116, which can perform at least some of the functions described with reference to FIG. 1, including receiving sensor data from the sensors 104a, 104b, and 104c, and processing the received images to perform tracking operations.

The HMD system 200 can include communications circuitry 204. The communications circuitry 204 can be used to transmit electronic communication signals to and receive electronic communication signals from at least one of a client device 208 or a server 212. The communications circuitry 204 can include wired or wireless interfaces (e.g., jacks, antennas, transmitters, receivers, transceivers, wire terminals) for conducting data communications with various systems, devices, or networks. For example, the communications circuitry 204 can include an Ethernet card and port for sending and receiving data via an Ethernet-based communications network. The communications circuitry 204 can communicate via local area networks (e.g., a building LAN), wide area networks (e.g., the Internet, a cellular network), and/or conduct direct communications (e.g., NFC, Bluetooth). The communications circuitry 204 can conduct wired and/or wireless communications. For example, the communications circuitry 204 can include one or more wireless transceivers (e.g., a Wi-Fi transceiver, a Bluetooth transceiver, a NFC transceiver, a cellular transceiver). For example, the communications circuitry 204 can establish wired or wireless connections with the at least one of the client device 208 or the server 212. The communications circuitry 204 can establish a USB connection with the client device 208.

The HMD system 200 can be deployed using different architectures. In some embodiments, the HMD (e.g., HMD body 202 and components attached to the HMD body 202) comprises the processing circuitry 116 and is self-contained portable unit. In some embodiments, the HMD has portions of the processing circuitry 116 that work in cooperation with or in conjunction with any type of portable or mobile computing device or companion device that has the processing circuitry or portions thereof, such as in the form of a staging device, a mobile phone or wearable computing device. In some embodiments, the HMD has portions of the processing circuitry 116 that work in cooperation with or in conjunction with processing circuitry, or portions thereof, of a desktop computing device. In some embodiments, the HMD has portions of the processing circuitry 116 that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

The client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching the client device 208 to clothing or the body via any type and form of accessory attachment. The client device 208 may be used to perform any portion of the image, tracking, and rendering processing pipeline described in connection with FIGS. 1 and 3. The HMD may perform some or other portions of the image, tracking, and rendering processing pipeline such as image capture and rendering to the display 164. The HMD can transmit and receive data with the client device 208 to leverage the client device 208's computing power and resources which may have higher specifications than those of the HMD.

The server 212 can be any type of form of computing device that provides applications, functionality or services to one or more client devices 208 or other devices acting as clients. In some embodiments, the server 212 can be a client device 208. The server 212 can be deployed in a data center or cloud computing environment accessible via one or more networks. The HMD and/or client device 208 can use and leverage the computing power and resources of the server 212. The HMD and/or client device 208 can implement any portion of the image, tracking, and rendering processing pipeline described in connection with FIGS. 1 and 3. The server 212 can implement any portion of the image, tracking, and rendering processing pipeline described in connection with FIGS. 1 and 3, and in some cases, any portions of the image, tracking, and rendering processing pipeline not performed by client device 208 or HMD. The server 212 may be used to update the HMD and/or client device 208 with any updated to the applications, software, executable instructions and/or data on the HMD and/or client device 208. For example, the server 212 can maintain the object trackers 140, and provide the object trackers 140 to the tracker controller 136.

The system 200 can include a position sensor 220. The position sensor 220 can output at least one of a position or an orientation of the body 202. As the image capture devices 104a, 104b, 104c can be fixed to the body 202 (e.g., at predetermined locations relative to the position sensor 220), the position sensor 220 can output at least one of a position or an orientation of each sensor 104a, 104b, 104c. The position sensor 220 can include at least one of an inertial measurement unit (IMU), an accelerometer, a gyroscope, or a magnetometer (e.g., magnetic compass).

Figure 3:
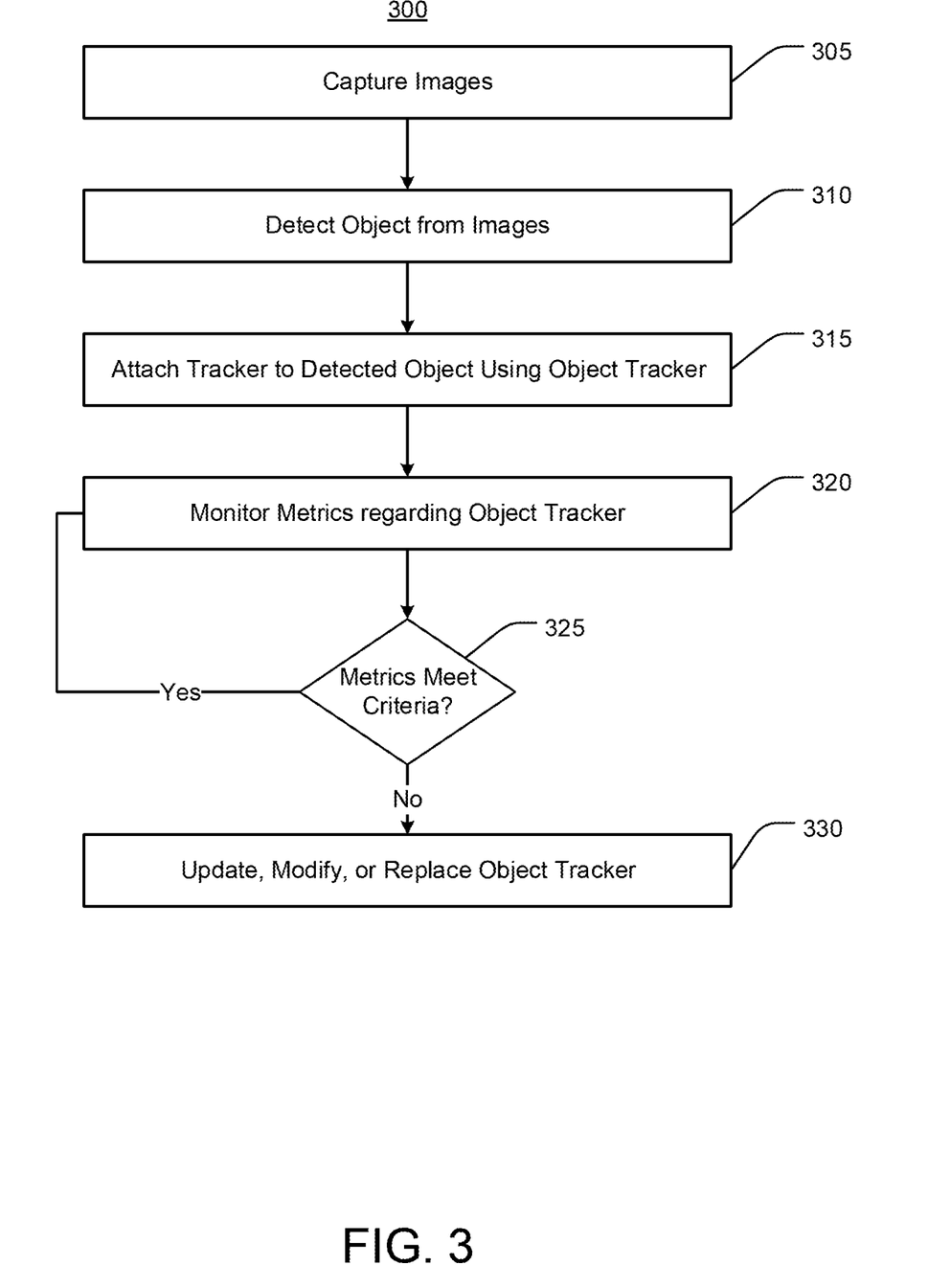
FIG. 3 is a flow diagram of a method for fallback tracking according to an implementation of the present disclosure.

Referring now to FIG. 3, a method 300 for fallback tracking is illustrated. The method 300 can be implemented by various devices and systems described herein, such as the system 100, processing circuitry 116, HMD system 200, and server system 400. In some embodiments, a method 300 can include one or more of the following steps. The method 300 can include capturing one or more images of an object (305). The method 300 can include detecting an object using the images (310). The method 300 can include attaching a tracker to the detected object (315). The method 300 can include monitoring one or more metrics regarding the tracker or an object tracker that attaches the tracker to the detected object (320). The method 300 can include determining whether the one or more metrics meet respective criteria (325). The method 300 can include updating, modifying, or replacing (e.g., using a different object tracker) the object tracker responsive to the one or more metrics not meeting the criteria.

At 305, one or more images of an object can be captured. The images can be captured responsive to operation of an HMD or AR system. The images can include one or more pixels representing a scene that includes the object. The images can be captured continuously. The images can be captured at a predetermined frame rate. The images can be captured by depth sensors, cameras, or video cameras. The images can be captured via lens(es) through which light is received to generate the images, such as by using image sensors. The images can be captured using sensors mounted, integrated, incorporated or arranged on an HMD to correspond to a left-eye view of a user or wearer of the HMD and a right-eye view of the user or wearer.

At 310, the object can be detected using the captured images. The images or portions thereof can be processed to detect or identify the object. For example, elements of the image, such as pixels or groups of pixels, can be processed to detect the image based on colors, shapes, edges, contrast between pixels or groups of pixels, and spatial relationships between pixels. The object can be detected using spatial filters, segmentation, or machine learning models trained to detect objects. The object can be detected by comparing candidate objects or portions thereof (e.g., one or more pixels representing features from the images) to template objects in a database and detecting the object responsive to matching the candidate object to the template object. The database can include location data of various objects, buildings, structures, roads, or other indoor and outdoor features, as well as textual or semantic information regarding objects, which can be used to match the objects to detect the object in the scene. In some embodiments, facial recognition is used to detect the object (e.g., detect faces).

At 315, a tracker is attached to the detected object by an object tracker. The tracker can be attached by tracking the detected object across the captured images, such as by assigning a plurality of tracking points to the detected object. The tracker can be attached responsive to detecting the object. The tracker can be attached at various tracking rates, such as tracking rates equal to a frame rate of the captured images (e.g., responsive to receiving each captured image), tracking rates less than the frame rate (e.g., by periodically sampling the captured images), or tracking rates greater than the frame rate (e.g., by interpolating the captured images).

The tracker can be attached by assigning the plurality of tracking points to pixels of the image that correspond to the detected object, such as pixels used to identify the detected object, or pixels representing edges, perimeters, or other features of the detected object. The plurality of tracking points can be assigned responsive to receiving the images. In some embodiments, object detection is performed on each image to detect the detected object and, in response, tracking points are assigned to the detected object.

In some embodiments, as images are continuously captured and received, image data or tracking points from previous images can be used to assign tracking points to the received images. For example, motion data indicative of motion of the detected object across images or motion of the HMD or AR system can be used to identify pixels corresponding to pixels of the detected object or the plurality of tracking points in the previous images, and in response tracking points can be assigned to the received images. For example, bounding boxes, centroids, Kalman filters, or other methods can be used to follow the detected object and generate tracking points across images.

A tracker can be attached to the detected object using the plurality of tracking points, such as by mapping image data of the tracker to at least one tracking point of the plurality of tracking points. The tracker can include two-dimensional or three-dimensional image data. The image data can be an image which may be used to be perceived as an overlay on the real-world detected object, such as an image representing a mask, crown, sunglasses, tools, or other objects. The image data of the tracker can indicate a parameter of the image to be displayed, such as parameters associated with brightness, color, or opacity.

In some embodiments, segmentation is performed using the images to generate one or more segments. Segmentation can be performed on the same, more, or fewer images than for which tracking points are assigned. Any of a variety of segmentation methods, such as clustering algorithms (e.g., K-means clustering), edge detection, or trained segmentation models can be used. For example, each segment can be generated to represent objects as well as non-object regions of the image (e.g., segment the image into a face, objects other than the face, such as buildings, and background, such as a sky).

At 320, one or more metrics regarding at least one of the tracker attached to the detected object or the object tracker that generates the tracker are determined or monitored. The one or more metrics can be determined based on data received from the object tracker or from processing circuitry on which the object tracker is implemented. For example, the metrics can be determined based on data indicating a rate at which the processing circuitry performs or executes instructions of the object tracker, or a processing demand or usage of the object tracker.

In some embodiments, the metrics are determined responsive to installation or initialization of the object tracker. In some embodiments, the metrics are determined responsive to motion data, such as motion data indicating motion of the detected object or the HMD or AR system operating the object tracker.

Any of a variety of metrics may be determined. For example, metrics can be determined that represent processing demand of the object tracker as well as how images rendered may be perceived by a user of the HMD or AR system, such as metrics corresponding to factors such as latency, lag, or judder. The one or more metrics can correspond to performance capabilities of the device that operates the object tracker, such as processing speeds, memory usage, network speeds, image frame rates, or image quality. In some embodiments, an attachment time metric is determined that indicates an attachment time from object detection by the object tracker to attaching a tracker to the detected object. In some embodiments, a recovery delay metric is determined that indicates a time that a user waits for recovery of tracking after loss of tracking. In some embodiments, a tracking success rate is determined that indicates a fraction of time that a user of the HMD or AR system experiences working AR. In some embodiments, a lag metric is determined that corresponds to a lag that the user may experience as the detected object or target moves. Metrics can be monitored over any number of cycles of operation of the object trackers, such as by maintaining statistical values such as mean, median, or standard deviations of metrics and updating the statistical values responsive to each instance in which a metric is determined.

At 325, a determination is made regarding whether the one or metrics meet respective criteria. For example, as metrics are determined, the metrics can be compared to respective criteria, such as minimum or maximum thresholds. Each metric may be compared to a corresponding threshold; for example, the attachment time metric can be compared to a maximum attachment time threshold, the recovery delay metric can be compare to a maximum recovery delay threshold, the tracking success rate can be compared to a minimum tracking success rate threshold, and the lag metric can be compared to a maximum lag threshold. As illustrated in FIG. 3, if the one or more metrics meeting the respective criteria, then the object tracker in operation may continue to be used.

At 330, if the one or more metrics do not meet the respective criteria, then the object tracker may be changed. For example, the object tracker can be updated or modified, such as by changing parameters of operation of the object tracker (e.g., a number of tracking points used). In some embodiments, the object tracker can be replaced, such as by requesting a different object tracker and installing the requested object tracker.

One or more metrics regarding the changed object tracker may be monitored as the changed object tracker operates. As such, object trackers can continuously be monitored to determine whether their performance meets appropriate criteria, and can be change (e.g., updated, modified, replaced) until an object tracker is used that has appropriate performance.

The method 300 or steps or operations thereof can be performed based on various conditions. In some embodiments, the method 300 is used to perform an initialization of the HMD or AR system or the object tracker. For example, the method 300 can be performed responsive to detecting that the HMD or AR system is in an initialization, restart, or setup mode. In some embodiments, the method 300 is performed on a periodic basis. For example, a schedule that indicates points in time can be monitored, and the method 300 can be performed responsive to detecting that a point in time of the schedule is tolled. The method 300 can be performed based on monitoring parameters such as a duration of usage of the HMD or AR system (e.g., re-evaluate operation of the object tracker after every hour of usage), or motion data of the HMD or of objects in the scene (e.g., re-evaluate operation of the object tracker responsive to motion of the HMD being greater than a motion threshold). The method 300 can be performed responsive to user input, such as user input indicating instructions to modify the object tracker or feedback indicating that the user is experiencing lag or other insufficient performance. The method 300 can be performed responsive to updates to firmware or software of the HMD or AR system or the object tracker. The method 300 can be performed based on any of a variety of machine learning models used by the HMD or AR system, such as a machine learning models used to perform object tracking or detection.

Figure 4:
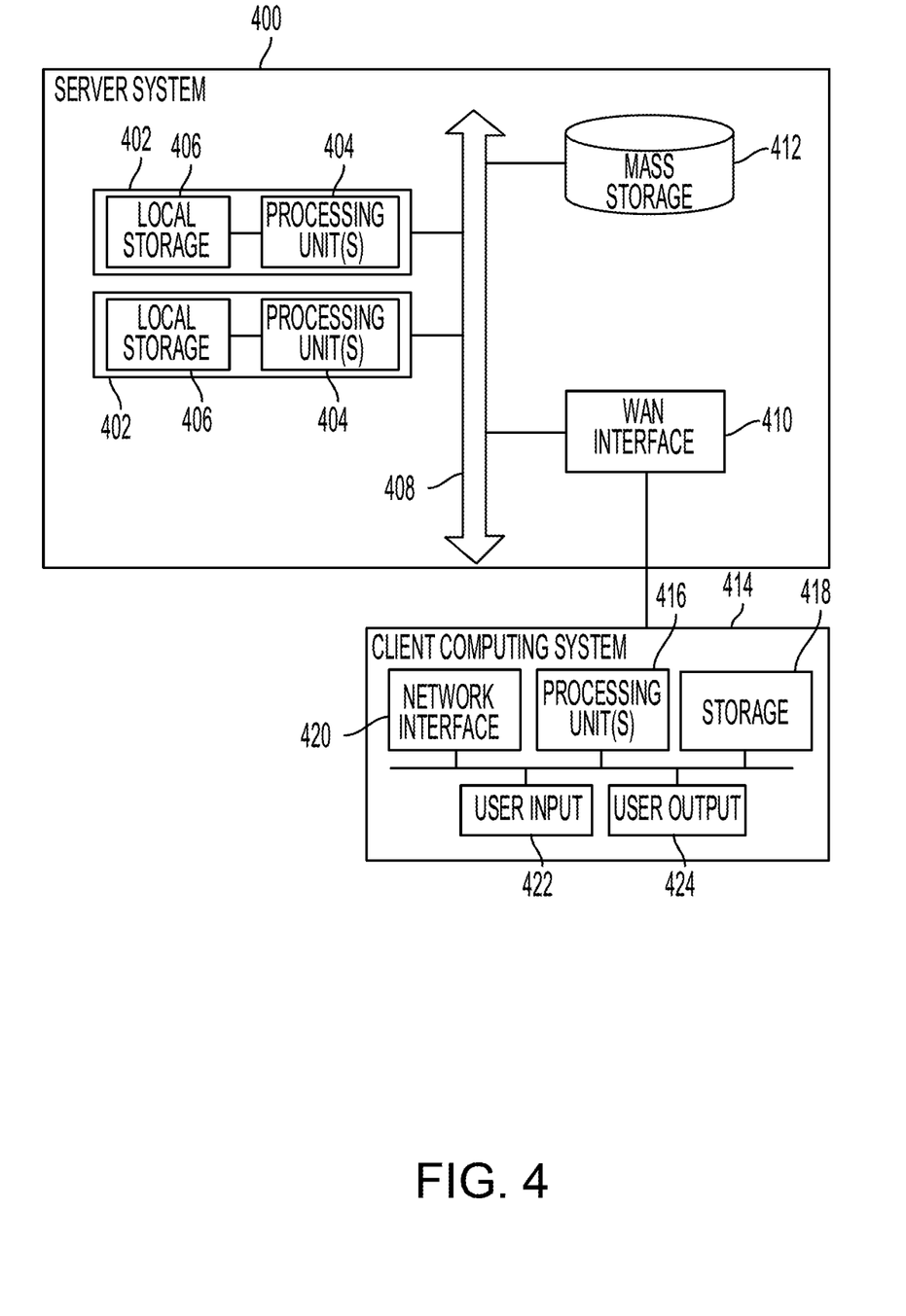
FIG. 4 is a block diagram of a computing environment according to an implementation of the present disclosure.

Various operations described herein can be implemented on computer systems. FIG. 4 shows a block diagram of a representative server system 400 and client computer system 414 usable to implement the present disclosure. Server system 400 or similar systems can implement services or servers described herein or portions thereof. Client computer system 414 or similar systems can implement clients described herein. Each of the systems 100, 200 and others described herein can incorporate features of the systems 400, 414.

Server system 400 can have a modular design that incorporates a number of modules 402 (e.g., blades in a blade server); while two modules 402 are shown, any number can be provided. Each module 402 can include processing unit(s) 404 and local storage 406.

Processing unit(s) 404 can include a single processor, which can have one or more cores, or multiple processors. Processing unit(s) 404 can include a general-purpose primary processor as well as one or more special-purpose co-processors such as graphics processors, digital signal processors, or the like. Some or all processing units 404 can be implemented using customized circuits, such as application specific integrated circuits (ASICs) or field programmable gate arrays (FPGAs). Such integrated circuits execute instructions that are stored on the circuit itself. Processing unit(s) 404 can execute instructions stored in local storage 406. Any type of processors in any combination can be included in processing unit(s) 404.

Local storage 406 can include volatile storage media (e.g., conventional DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 406 can store one or more software programs to be executed by processing unit(s) 404, such as an operating system and/or programs implementing various server functions such as functions of the system 100, or any other system described herein, or any other server(s) associated with the system 100 or any other system described herein.

"Software" refers generally to sequences of instructions that, when executed by processing unit(s) 404 cause server system 400 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

Local storage 406 can provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. Additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Conventional work allocation techniques can be used. As requests are processed, results can be returned to the requester via WAN interface 410. Such operation can generally be automated. WAN interface 410 can connect multiple server systems 400 to each other, providing scalable systems capable of managing high volumes of activity. Conventional or other techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include conventional computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to a wide area network (e.g., the Internet) to which WAN interface 410 of server system 400 is also connected. Network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
    executing, by one or more processors of a device, a first object tracker to perform a detection of one or more objects in images received via a sensor of the device and an attachment of a tracker to the one or more objects;
    monitoring, by the one or more processors, one or more metrics of the first object tracker, the one or more metrics comprising a time from the detection by the one or more processors of the device of the one or more objects to the attachment by the one or more processors of the device of the tracker to the one or more objects, the one or more metrics received at intervals;
    determining, by the one or more processors, that the one or more metrics do not meet a criteria corresponding to a profile of the device; and
    using, by the one or more processors, responsive to the determination, a second object tracker instead of the first object tracker.

2. The method of claim 1, further comprising:
    selecting, by the one or more processors, the second object tracker from a plurality of second object trackers based on the one or more metrics.

3. The method of claim 1, further comprising:
    receiving, by the one or more processors from a remote device, information to configure the second object tracker; and
    configuring, by the one or more processors, the one or more processors to use the second object tracker responsive to the information.

4. The method of claim 1, further comprising:
    monitoring, by the one or more processors, the one or more metrics to determine whether the second object tracker meets the criteria; and
    using, by the one or more processors, a third object tracker instead of the second object tracker responsive to the second object tracker not meeting the criteria.

5. The method of claim 1, wherein monitoring the one or more metrics includes monitoring, by the one or more processors, a tracking success rate corresponding to a fraction of time that the time from the detection of the one or more objects to the attachment of the tracker is less than a threshold.

6. A system, comprising:

one or more processors configured to:

execute a first object tracker to perform a detection of one or more objects in images received via a sensor of a device and an attachment of a tracker to the one or more objects;

monitor one or more metrics of the first object tracker, the one or more metrics comprising a time from the detection of the one or more objects by the one or more processors to the attachment of the tracker to the one or more objects by the one or more processors, the one or more metrics received at intervals;

determine that the one or more metrics do not meet a criteria corresponding to a profile of the device; and use, responsive to the determination, a second object tracker instead of the first object tracker.

7. The system of claim 6, wherein the one or more processors are further configured to select the second object tracker from a plurality of second object trackers based on the one or more metrics.

8. The system of claim 6, wherein the one or more processors are further configured to:

receive, from a remote device, information to configure the second object tracker; and configure the one or more processors to use the second object tracker responsive to the information.

9. The system of claim 6, wherein the one or more processors are configured to:

monitor the one or more metrics to determine whether the second object tracker meets the criteria; and use a third object tracker instead of the second object tracker responsive to the second object tracker not meeting the criteria.

10. The system of claim 6, wherein the one or more processors are configured to monitor the one or more metrics by monitoring a tracking success rate corresponding to a fraction of time that the time from the detection of the one or more objects to the attachment of the tracker is less than a threshold.

11. The method of claim 1, wherein the one or more metrics comprise a delay from a time of loss of tracking of the one or more objects by the one or more processors of the device to a recovery of tracking of the one or more objects by the one or more processors of the device.

* * * * *